G. Stackpole,
Bit Stock.
N° 36,538.   Patented Sep. 23, 1862.
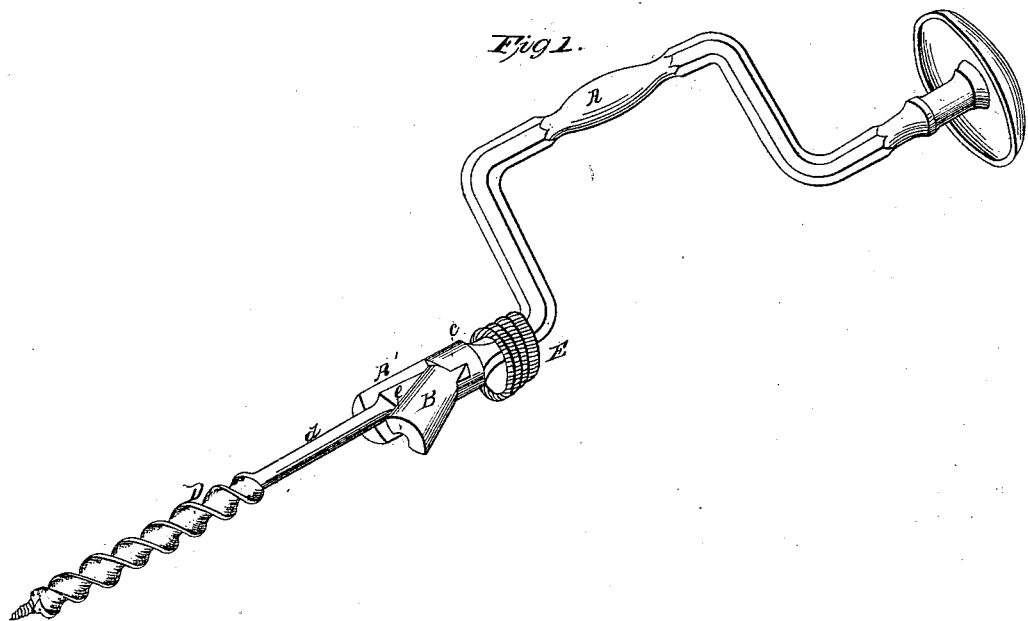
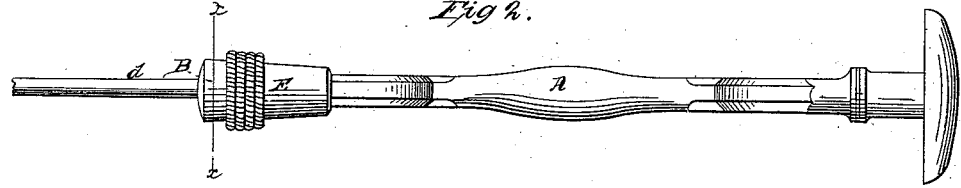
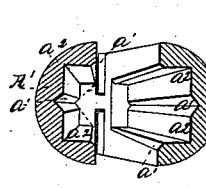 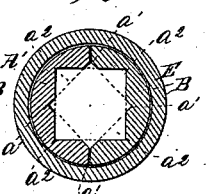 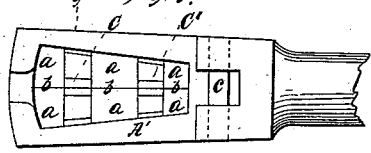
Witnesses:
Gustavus Dietrich
Edwin S. ——
Inventor:
Greenleaf Stackpole
by
Mason, Fenwick & Lawrence
Attys

UNITED STATES PATENT OFFICE.

GREENLEAF STACKPOLE, OF PORTLAND, MAINE.

IMPROVEMENT IN BIT-BRACES.

Specification forming part of Letters Patent No. 36,538, dated September 23, 1862.

*To all whom it may concern:*

Be it known that I, GREENLEAF STACKPOLE, of the city of Portland, county of Cumberland, and State of Maine, have invented a new and useful Improvement in Bit-Braces; and I do hereby declare the following to be a full and exact description thereof, reference being had to the accompanying drawings, and to the letters of reference marked thereon, like letters in the several figures indicating the same or analogous parts, and in which drawings—

Figure 1 is a perspective view of my improved bit-brace; Fig. 2, a side view of same; and Fig. 3, a sectional perspective view in the line $x\,x$, Fig. 2. Fig. 4 is a cross-section in line $y\,y$, Fig. 5, and Fig. 5 is a plan view with the jaw of the bit-brace removed.

The nature of my invention consists in so forming the socket of a bit-brace that its jaws shall grip the bit with a solid bearing upon every side of the tang of the bit, both at the starting-point of the tang as well as at or near its termination, thus giving the bit a firm and steady bearing in the brace.

The body of the brace A is made in the usual manner and in the approved form, as shown in Figs. 1 and 2. Its outer end, as at A′, (see Fig. 5,) is constructed to form a continuation of the main portion of the implement, and is forged into a half-socket, $b$, for the reception of the shank or tang of the bit to be used in connection therewith, the fellow half socket being formed in the jaw B, said jaw being so formed at one extremity as to be hinged to and articulate upon the pin $c$, as clearly indidated in Figs. 1 and 5.

As shown in Fig. 5, the socket formed by the part A′ and the jaw B is spaced off by tang-bearings C C′, which project out from the walls $a$ of the socket. These bearings have V-shaped grooves $a'\,a^2$ cut in them, as indicated, said grooves tapering in exact conformity with the taper of the shank or tang of the bit which they are intended to grip. The bearings C and C′ are spaced apart from each other within the socket, so that the bearings C shall clasp or grip the shank $e$ of the bit D at a point near where the shank terminates in the body or stem $d$ of the bit, and so that the bearing C′ shall clasp or grip said shank at a point near its outer end.

As shown in Figs. 4 and 5, the tapered grooves $a'$ and $a^2$ permit of the insertion in the socket $b$ of bits having shanks of different sizes. A shank which would be clasped by the angular tapering grooves $a'$ would be of less size or diameter than a shank of a size to be gripped by the grooves $a^2$.

In Fig. 3 I have shown a socket without the bearings C C′, the angular grooves being fitted to receive two sizes of bit-shanks, but formed or cut in the body of the metal composing the part A′ and the jaw B. The socket of the bit-brace, as illustrated by Figs. 4 and 5, is, however, preferable, as a mode of holding the bit, to that shown in Fig. 3, for the reason that although the bit-brace may have been in the first instance formed for only two bits with shanks of a given size, yet the grooves which are adapted to receive the smaller size may very readily be enlarged, if occasion require, so as to fit any given size intermediate between the original sizes of shanks which the stock was adapted to receive. This enlargement of the lesser grooves $a'$ may be effected by simply deepening the grooves $a'$ in the bearings C and C′ with a small chisel, the depth of the cut required being such as to permit of accurate work.

E is a metal ring, with its interior surface conical to fit upon the parts A′ and B when closed, as shown in Fig. 2, and thus hold the bit D firmly in place within the socket. When the socket is closed, as shown in the last-named figure, the bit D can be removed by turning the ring with a downward pressure until it drops into the position shown in Fig. 1, whereupon the jaw B may be thrown into the open position shown by a lateral pressure of the bit against the jaw.

Having thus described my invention, what I claim as new, and desire to secure by Letters Patent of the United States, is—

1. Forming the socket of a bit-brace with bit-shank bearings C C′, substantially as and for the purpose set forth.

2. So forming the bearings C C′ that the lesser grooves therein may be made to receive more than one-sized bit-shank without an enlargement of the grooves to the extent of the whole length of the socket or the bit-shank, substantially as specified.

3. In combination with a divided bit-shank socket having bearings C C', as specified, the ring E, for holding said bearings upon the shank with a solid unyielding impact at two points of its length, substantially as set forth.

GREENLEAF STACKPOLE.

Witnesses:
L. D. M. SWEAT,
J. E. KENT.